(12) United States Patent
Black et al.

(10) Patent No.: US 11,474,749 B2
(45) Date of Patent: Oct. 18, 2022

(54) CONFIGURING HOST ACCESS FOR VIRTUAL VOLUMES

(71) Applicant: EMC IP Holding Company LLC, Hopkinton, MA (US)

(72) Inventors: David L. Black, Acton, MA (US); Dmitry Nikolayevich Tylik, Westborough, MA (US); Alexey Vladimirovich Shusharin, Saint Petersburg (RU); Marina Shem Tov, Hod Hasharon (IL); Mukesh Gupta, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 17/154,000

(22) Filed: Jan. 21, 2021

(65) Prior Publication Data

US 2022/0229604 A1 Jul. 21, 2022

(51) Int. Cl.
*G06F 3/06* (2006.01)
*G06F 9/455* (2018.01)

(52) U.S. Cl.
CPC .......... *G06F 3/0664* (2013.01); *G06F 3/0604* (2013.01); *G06F 3/067* (2013.01); *G06F 3/0665* (2013.01); *G06F 9/45558* (2013.01); *G06F 2009/45579* (2013.01); *G06F 2009/45583* (2013.01)

(58) Field of Classification Search
CPC ....... G06F 9/45558; G06F 2009/45595; G06F 2009/45579; G06F 2009/45583; G06F 9/45533; G06F 9/45537
See application file for complete search history.

(56) References Cited

U.S. PATENT DOCUMENTS

| | | | |
|---|---|---|---|
| 9,983,807 B1 | 5/2018 | Tylik et al. | |
| 10,089,136 B1 | 10/2018 | Zhang et al. | |
| 10,768,837 B2 | 9/2020 | Tylik et al. | |
| 10,891,060 B2 | 1/2021 | Tylik et al. | |
| 11,163,463 B2 | 11/2021 | Tylik et al. | |
| 2006/0143506 A1* | 6/2006 | Whitt | G06F 3/0689 714/6.12 |
| 2021/0405899 A1* | 12/2021 | Keshava | G06F 3/0634 |

* cited by examiner

*Primary Examiner* — Jane Wei
(74) *Attorney, Agent, or Firm* — BainwoodHuang (57) ABSTRACT

Discovery service contact information is provided from a data storage system to administration logic of a virtualization environment, and distributed within the virtualization environment to hypervisor hosts, enabling the hypervisor hosts to discover logical ports within the data storage system, and then establish logical communication paths between the hypervisor hosts and the ports. In response to determining that the data storage system supports virtual volumes, the hypervisor hosts indicate hypervisor capability of using virtual volumes to the data storage system, and the data storage system exposes virtual volumes to hypervisors in response to indications of the ability of those hypervisors to use virtual volumes.

12 Claims, 8 Drawing Sheets

CONFIGURING HOST ACCESS FOR VIRTUAL VOLUMES

TECHNICAL FIELD

The present disclosure relates generally to integration of data storage systems with virtualization environments, and more specifically to technology for configuring hypervisor hosts with access to virtual volumes that are provided by a data storage system.

BACKGROUND

Data storage systems are arrangements of hardware and software that include one or more storage processors coupled to non-volatile data storage drives, such as solid state drives. Each storage processor services host I/O requests received from host computers ("hosts"). The host I/O requests received by the storage processor may specify one or more data storage objects (e.g. volumes, virtual volumes, etc.) that are hosted by the storage system and accessed by the hosts. Each storage processor executes software that processes the host I/O requests, and performs various data processing tasks to organize and persistently store data indicated by the host I/O requests in the non-volatile data storage drives of the data storage system.

Virtualization environments are computing platforms that include one or more host computers that execute hypervisors ("hypervisor hosts"). Each hypervisor running in a hypervisor host creates and runs one or more virtual machines, and provides virtual disks to the virtual machines that it runs, e.g. to persistently store data that is generated and/or used by those virtual machines. The underlying non-volatile data storage that supports the virtual disks may be provided from a data storage system.

SUMMARY

In order to provide control and management of data services that are provided by a data storage system to a virtualization environment, it is desirable for the data storage system to be tightly integrated with the hypervisor hosts and the hypervisors that they execute. To facilitate such integration, some virtualization environments use a set of specialized APIs (Application Programming Interfaces) that are referred to as VASA (vStorage APIs for Storage Awareness), and are provided by VMware, Inc. VASA enables the virtualization environment to recognize capabilities of the data storage system. VASA APIs may be used by administration logic executing within the virtualization environment, such as a vCenter Server operating within a vSphere virtualization environment provided by VMware, Inc., and/or by hypervisors themselves, such as ESXi hypervisors also provided by VMware, Inc. VASA supports the use of individual virtual volumes (sometimes referred to as "vVols"), as defined by VMware, Inc. Virtual volumes provide non-volatile data storage within the data storage system for corresponding individual virtual disks. Virtual volumes are created within logical storage containers known as vVol Datastores, and enable data services that are provided by the data storage system to be utilized by the virtualization environment at the granularity of individual virtual disks. Such data services may, for example, include Quality-of-Service controls, encryption, remote replication, and snapshot creation. In contrast, data services typically cannot be leveraged at the level of individual virtual disks when those virtual disks are supported by other types of datastores, e.g. virtual disks that are supported by VMFS (Virtual Machine File System) Datastores.

It is desirable for the data storage system to provide virtual volumes in combination with new storage attachment technologies, such as NVMe (Non-Volatile Memory Express), and/or NVMe-oF™ (Non-Volatile Memory Express over Fabric), as defined by NVM Express®. In order to do so, access to the data storage system by the hypervisor hosts in the virtualization environment should be configured with certain technical objectives in mind. For example, each hypervisor in the virtualization environment should retrieve a NVMe Discovery Service out of band from the data storage system, and then connect to an NVMe subsystem within the data storage system. In addition, each virtual volume should be exposed by the data storage system as an NVMe namespace once it is bound for I/O access. However, access to NVMe namespaces of virtual volumes should only be exposed to hypervisors that are capable of using virtual volumes, referred to herein for purposes of explanation as "vVol-capable hypervisors". This is due to the fact that a hypervisor may or may not be capable of handling the relatively large number of virtual volumes that may be exposed over NVMe. For example, the total number of NVMe namespaces of virtual volumes that may be exposed to a hypervisor may be in the tens of thousands, while the total number of NVMe namespaces of other types of volumes may only be in the thousands. Accordingly, a non-vVol-capable hypervisor should be prevented from performing NVMe commands (e.g. Identify Namespaces commands) on a datastore containing virtual volumes, in order to avoid overwhelming the storage stack of the hypervisor with a total number of returned results that exceeds its capabilities.

It is also desirable to avoid multiple switches between a user interface of the administration logic of the virtualization environment (e.g. the vSphere client user interface) and a user interface of the administration logic of the data storage system during the host configuration process. Below is an example of a possible configuration sequence that would require the system administration user to switch multiple times between the virtualization environment and data storage system administration user interfaces:

1. (Data Storage System Administration UI) Create a storage container in the data storage system.
2. (Virtualization Environment Administration UI) Register a VASA vendor provider in the data storage system.
3. (Virtualization Environment Administration UI) Mount the Storage Container on one or more hypervisor hosts:
   a. hypervisor hosts establish VASA sessions with the VASA vendor provider.
   b. hypervisor hosts invoke setContext( ) and queryArrays( ) VASA APIs to provide Host NQNs (NVMe Qualified Names) to the data storage system, and retrieve NVMe Discovery Service contact information.
   c. hypervisor hosts discover NVMe ports to connect to in the data storage system.
   d. hypervisor hosts connect to the discovered NVMe ports, resulting in NVMe controllers being created in the data storage system.
4. (Data Storage System Administration UI) Host objects are created in the data storage system for the hypervisor hosts that have connected to the NVMe ports. Hypervisor hosts executing vVol-capable hypervisors must be distinguished from hypervisor hosts executing non-vVol-capable hypervisors, e.g. manually by the system administration user.

5. (Virtualization Environment Administration UI) Virtual machines are created that can be run, requiring hypervisor host access configuration in order to successfully bind Virtual Volumes.

The above configuration sequence has shortcomings, for example that the mounted storage container is inaccessible for I/O (an inaccessible NVMe vVol Datastore condition) after step #3 is performed, until the host objects are created on the storage array in step #4. In another example, a shortcoming of the above configuration sequence is that it requires multiple switches between the two administration user interfaces, which is inconvenient and time consuming for the system administration user.

To meet one or more of the above described technical objectives, and/or address shortcomings of host access configuration approaches such as the above described configuration sequence, technology is described herein that provides discovery service contact information from a data storage system to administration logic of a virtualization environment. The discovery service contact information describes how to contact a discovery service within the data storage system. The discovery service contact information is distributed within the virtualization environment from the administration logic of the virtualization environment to at least one hypervisor host within the virtualization environment.

In some embodiments, at least one port located within the data storage system (e.g. at least one NVMe port) is discovered by the hypervisor host from the discovery service within the data storage system, and a logical communication path is established between the hypervisor host and the port located within the data storage system.

In some embodiments, the hypervisor host retrieves information from the data storage system indicating whether the data storage system supports virtual volumes, and the hypervisor host determines that the data storage system supports virtual volumes from the information retrieved from the data storage system indicating whether the data storage system supports virtual volumes.

In some embodiments, retrieving the information from the data storage system indicating whether the data storage system supports virtual volumes consists of or includes retrieving a list of supported universally unique identifiers (UUIDs) from the data storage system, and determining that the data storage system supports virtual volumes consists of or includes finding a predetermined value indicating that the storage system supports virtual volumes within the list of supported universally unique identifiers retrieved from the data storage system.

In some embodiments, the hypervisor host issues a command indicating that a hypervisor executing within the hypervisor host is capable of using virtual volumes to the data storage system in response to the hypervisor host determining that the data storage system supports virtual volumes, and then an indication that the hypervisor executing within the hypervisor host is capable of using virtual volumes is stored within the data storage system.

In some embodiments, the command indicating that the hypervisor executing the hypervisor host is capable of using virtual volumes is an NVMe (Non-Volatile Memory Express) admin set features command.

In some embodiments, the disclosed technology may further create a storage container within the data storage system, and the hypervisor executing in the hypervisor host creates at least one virtual volume within the storage container. The virtual volume is allowed to be used by the hypervisor executing within the hypervisor host in response to the indication that the hypervisor executing within the hypervisor host is capable of using virtual volumes.

In some embodiments, the hypervisor executing within the hypervisor host includes a first set of logic and a second set of logic, where the first set of logic is capable of using virtual volumes and the second set of logic is not capable of using virtual volumes. In such embodiments, the disclosed technology allows the virtual volume to be used by the hypervisor executing within the hypervisor host by allowing the first set of logic within the hypervisor to use the virtual volume.

Embodiments of the disclosed technology may provide significant technical advantages over other technical solutions. For example, embodiments of the disclosed technology may provide host access configuration between a virtualization environment and a data storage system in a way that requires only one switch between the user interface of the administration logic of the virtualization environment and the user interface of the administration logic of the data storage system. In another example, embodiments of the disclosed technology may prevent virtual volumes from being exposed to a hypervisor that is not capable of using virtual volumes. In this way the disclosed technology may prevent a non-virtual volume capable hypervisor (or logic within a hypervisor that may not be capable of using virtual volumes for hypervisors that include both virtual volume capable and non-virtual volume capable logic) from being overwhelmed by a large total number of returned results caused by the exposure of virtual volumes to the hypervisor, e.g. results representing the relatively large total number of virtual volumes that may be exposed by the data storage system.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

Embodiments of the disclosed technology avoid shortcomings of other approaches by providing discovery service contact information that describes how to contact a discovery service within a data storage system from the data storage system to administration logic of a virtualization environment, which then distributes the discovery service contact information is distributed within the virtualization environment to at least one hypervisor host within the virtualization environment. At least one port located within the data storage system (e.g. at least one NVMe port) is discovered by the hypervisor host from the discovery service within the data storage system, and a logical communication path is established between the hypervisor host and the port located within the data storage system. The hypervisor host then retrieves information from the data storage system indicating whether the data storage system supports virtual volumes, and may determine from the retrieved information that the data storage system supports virtual volumes. The hypervisor host issues a command to the data storage system indicating that a hypervisor executing within the hypervisor host is capable of using virtual volumes to the data storage system in response to the hypervisor host determining that the data storage system supports virtual volumes. A storage container is created within the data storage system, and at least one virtual volume can be created within the storage container by the hypervisor executing within the hypervisor host, and used by hypervisor executing within the hypervisor host in response to the indication stored by the data storage system that the hypervisor executing within the hypervisor host is capable of using virtual volumes.

Figure 1:
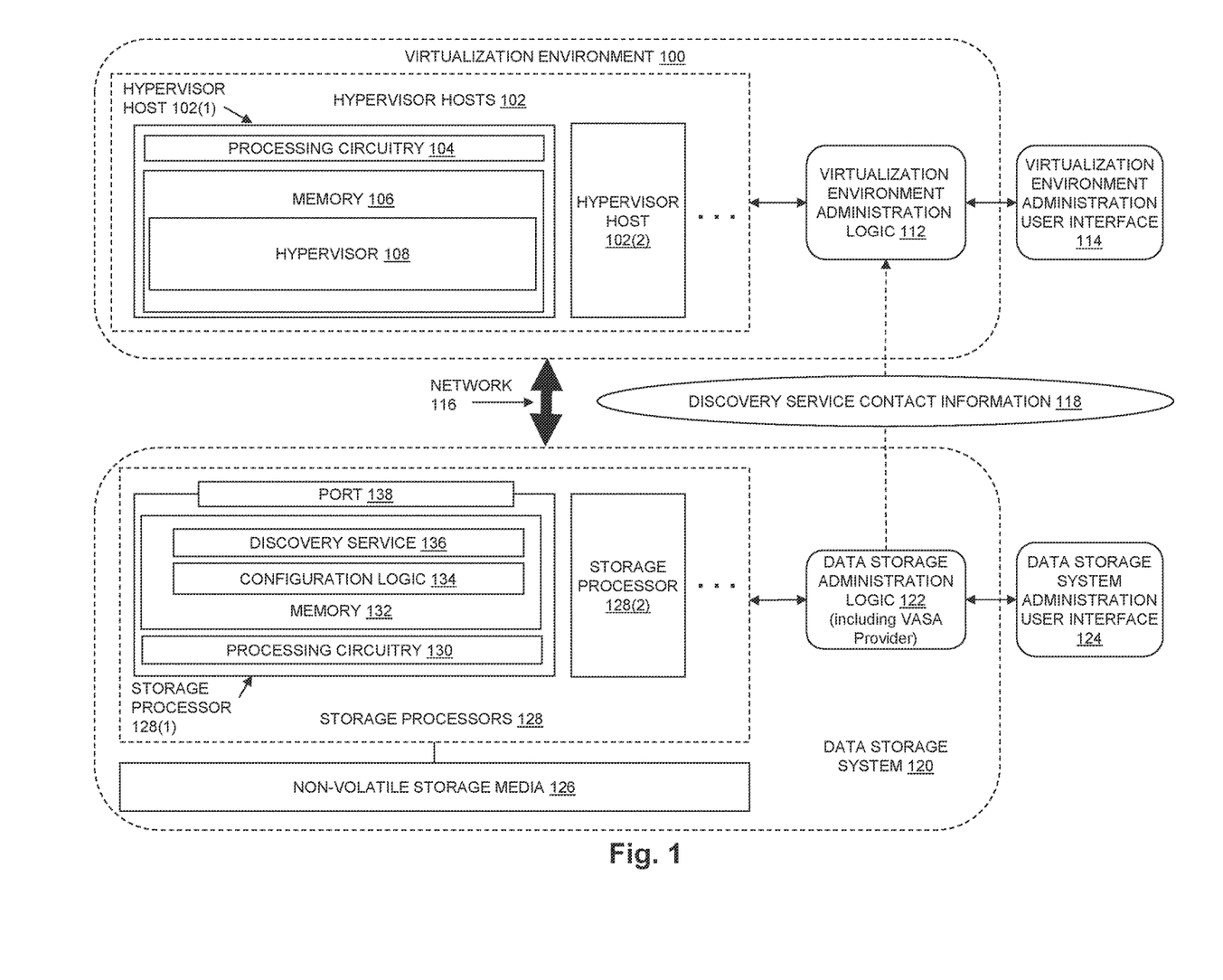
FIG. 1 is a block diagram showing an example of a virtualization environment and a data storage system at the start of host access configuration.

FIG. 1 is a block diagram showing an operational environment for the disclosed technology in which the disclosed technology is embodied. In the example of FIG. 1, the components are shown at the start of the host access configuration process. Virtualization Environment 100 is a virtualization platform, e.g. the vSphere virtualization platform provided by VMware, Inc. Hypervisor Hosts 102 are hardware servers. Any specific number of hypervisor hosts may be used, and for purposes of illustration Hypervisor Hosts 102 are shown by Hypervisor Host 102(1), Hypervisor Host 102(2), and so on. Each hypervisor host 102 includes a memory (e.g. RAM and/or other types of computer memory) storing program code that is executed on the processing circuitry of the hypervisor host, as well as data generated and/or processed by such program code. The processing circuitry of each hypervisor host may, for example, include or consist of one or more microprocessors, e.g. central processing units (CPUs), multi-core processors, chips, and/or assemblies, and associated circuitry. Hypervisor Host 102(1) is shown including a Memory 106 and Processing Circuitry 104.

The program code that each hypervisor host executes includes or consists of a hypervisor that creates and runs one or more virtual machines, such as the ESXi hypervisor provided by VMware, Inc. For example, the Hypervisor Host 102(1) is shown executing Hypervisor 108.

In some embodiments, the hypervisor executing within each hypervisor host may consist of or include a first set of program logic that is capable of using virtual volumes (referred to as the "vVol personality" of the hypervisor), and a second set of program logic that is not capable of using virtual volumes (referred to as the "non-vVol personality" of the hypervisor). In such embodiments, the vVol personality is identified by a first host name/host identifier pair (e.g. a first <Host NQN, Host ID> pair), and the non-vVol personality is identified by a second host name/host identifier pair (e.g. a second <Host NQN, Host ID> pair). In such embodiments, the non-vVol personality program code is operable to use relatively lower numbers of NVMe namespaces, e.g. totaling only in the thousands, while the vVol personality program code is operable to use relatively higher numbers of NVMe namespaces, e.g. totaling in the tens of thousands. Some embodiments of the disclosed technology may ensure that a non-vVol personality is not given access to NVMe namespaces for virtual volumes, e.g. in NVMe commands that it issues such as Identify Namespaces commands, in order to avoid overwhelming the non-vVol personality.

Virtualization Environment 100 also includes Virtualization Environment Administration Logic 112. Virtualization Environment Administration Logic 112 includes or consists of program code that provides a centralized platform for a system administrator user to control Virtualization Environment 100. One example of Virtualization Environment Administration Logic 112 is vCenter Server and/or vSphere Web Client, provided by VMware, Inc. Virtualization Administration Logic 112 may execute in whole or in part as one or more virtual machines executing on one or more hypervisors in one or more of the Hypervisor Hosts 102, and/or on a system administrator user's computer.

Virtualization Environment Administration Logic 112 generates a graphical user interface (GUI) that is displayed to and used by the administrator user for Virtualization Environment 100. In the example of FIG. 1, Virtualization Environment Administration Logic 112 generates Virtualization Environment Administration User Interface 114, which may be displayed to and used by the system administrator user, e.g. through a Web browser or the like.

A Network 116 communicably interconnects Virtualization Environment 100 with Data Storage System 120. Network 116 may include or consist of a Fibre Channel (FC) type network, an Ethernet based network, and/or some other type of network.

Data Storage System 120 includes Non-Volatile Storage Media 126 and one or more storage processors, shown by Storage Processors 128. Data Storage System 116 may consist of or include one or more NVMe subsystems.

Non-Volatile Storage Media 126 consists of or includes one or more solid-state data storage devices, such as, for example, one or more solid-state drives.

Any specific number of storage processors may be used, and for purposes of illustration Storage Processors 128 are shown including Storage Processor 128(1), Storage Processor 128(2), and so on. Each storage processor includes a memory (e.g. RAM and/or other types of computer memory) storing program code that is executed on the processing circuitry of the storage processor, as well as data generated and/or processed by such program code. The processing circuitry of each storage processor may, for example, include or consist of one or more microprocessors, e.g. central processing units (CPUs), multi-core processors, chips, and/or assemblies, and associated circuitry. Storage Processor 128(1) is shown including a Memory 132 and Processing Circuitry 130. Each storage processor may further include one or more network ports ("ports"). Each port is operable to serve as at least part of a communication endpoint for one or more logical communication paths over Network 116 that connect the Data Storage System 120 with one or more of the hypervisor hosts. The ports of each storage processor may each consist of or include at least one NVMe port. Each port may be identified by contact information that uniquely identifies the port, such as a port number, IP address, and/or type of transport protocol. For example, Storage Processor 128 is shown including Port 138.

The program code that one or more of the storage processors execute may include an NVMe discovery service, as shown for example by Discovery Service 136 in Storage Processor 128(1). Discovery Service 136 is a discovery mechanism that is operable to provide a list of NVMe subsystems that are accessible to the Hypervisor Hosts 102, including for example Data Storage System 120. Information provided from Discovery Service 136 to the Hypervisor Hosts 102 enables Hypervisor Hosts 102 to discover and establish communication paths to ports in Data Storage System 120.

The program code that one or more of the storage processors execute may include configuration logic (e.g. Configuration Logic 134 in Storage Processor 128(1)), that is operable when executed to provide host access configuration functionality on the data storage system, at least in part by performing some or all of the host access configuration techniques described herein.

Further program code components that one or more storage processors may execute are shown in FIGS. 2-6, such as one or more logical NVMe controllers (e.g. Controller 202), created during the host access configuration process to provide access between corresponding hypervisor hosts and the Data Storage System 120, and one or most host objects (e.g. Host Objects 500) that attributes of a corresponding hypervisor hosts, such as an indication of whether the hypervisor that is running in the corresponding hypervisor host is capable of using virtual volumes.

Data Storage System 120 also includes Data Storage System Administration Logic 122. Data Storage System Administration Logic 122 includes or consists of program code that provides a centralized platform for a system administrator user to control Data Storage System 120. Data Storage System Administration Logic 122 may include a VASA provider (or "VP", also known as a "VASA vendor provider"), through which Virtualization Environment Administration Logic 112 may obtain Discovery Service Contact Information 118. Data Storage System Administration Logic 122 may execute in whole or in part in one or more of the Storage Processors 128 (e.g. as part of Configuration Logic 134), and/or on a system administrator user's computer.

Data Storage System Administration Logic 122 generates a graphical user interface (GUI) that is displayed to and used by a system administrator. In the example of FIG. 1, Data Storage System Administration Logic 122 generates Data Storage System Administration User Interface 124, which may be displayed to and used by the system administrator user, e.g. through a Web browser or the like.

The processing circuitry and memory in the hypervisor hosts and storage processors together form programmed electronic circuitry that is configured and arranged to carry out various methods and functions described herein. When program code stored in the memory of the hypervisor hosts is executed by the processing circuitry of the hypervisor hosts, and/or program stored in the memory of the storage processors is executed by the processing circuitry of the storage processors, the respective processing circuitry of the hypervisor hosts and/or storage processors is caused to carry out the operations of the various methods and functions described herein.

During operation, Virtualization Environment Administration User Interface 114 is accessed by a system administrator user, who registers the VASA provider in Data Storage Administration Logic 122 with the Virtualization Environment Administration Logic 112. The information provided by the system administrator user to the Virtualization Environment Administration Logic 112 to register the VASA provider with the Virtualization Environment Administration Logic 112 (e.g. identifiers, port numbers, addresses, etc. for the VASA provider) enables the Virtualization Environment Administration Logic 112 to establish a VASA communication session with the VASA provider in Data Storage Administration Logic 122 over Network 116. Virtualization Environment Administration Logic 112 then uses the VASA communication session established with the VASA provider in Data Storage Administration Logic 122 to retrieve Discovery Service Contact Information 118 from the VASA provider in Data Storage Administration Logic 122 over the VASA communication session. The Discovery Service Contact Information 118 includes information (e.g. identifiers, port numbers, addresses, etc. for Discovery Service 136) describing how to access Discovery Service 136. The Discovery Service Contact Information 118 is received by Virtualization Environment Administration Logic 112, and then distributed within Virtualization Environment 100 by Virtualization Environment Administration Logic 112 to each one of the Hypervisor Hosts 102. Each one of the hypervisor hosts in Hypervisor Hosts 102 then accesses Discovery Service 136, and obtains a list of NVMe subsystems that are accessible to the Hypervisor Hosts 102, including Data Storage System 120, along with information (e.g. identifiers, port numbers, addresses, etc.) that enables each one of the hypervisor hosts to establish one or more logical communication paths to Data Storage System 120 over Network 116.

Figure 2:
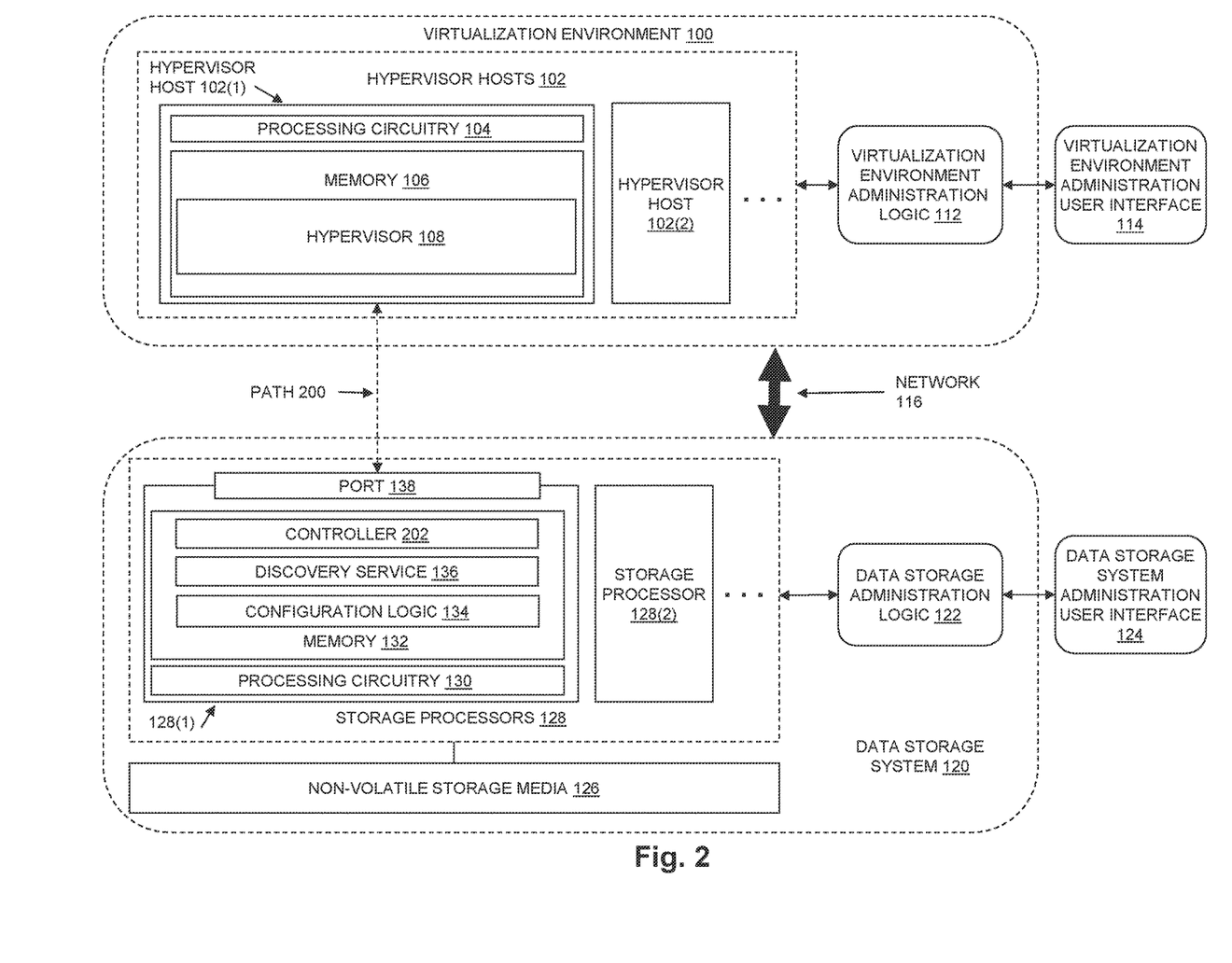
FIG. 2 is a block diagram showing the virtualization environment and data storage system of FIG. 1 after a logical communication path has been established between a hypervisor in the virtualization environment and a storage processor in the data storage system.

For example, as shown in FIG. 2, Hypervisor Host 102(1) (e.g. by execution of Hypervisor 108) may discover, from information provided by Discovery Service 136, at least one port located within the data storage system (e.g. at least one NVMe port), such as Port 138. Hypervisor Host 102(1) (e.g. by execution of Hypervisor 108) then establishes a logical communication path between the Hypervisor Host 102(1) and Port 138 of Storage Processor 128(1), as shown in FIG. 2 by Path 200. Path 200 is communication path established between Hypervisor Host 102(1)/Hypervisor 108 and Storage Processor 128(1) based on information obtained from Discovery Service 136. As shown by Controller 202, a logical NVMe controller may also be created when Path 200 is created. Controller 202 is a logical NVMe controller generated by Configuration Logic 134 to represent the data storage end of the Path 200 between Hypervisor Host 102(1)/Hypervisor 108 and Storage Processor 128(1).

Figure 3:
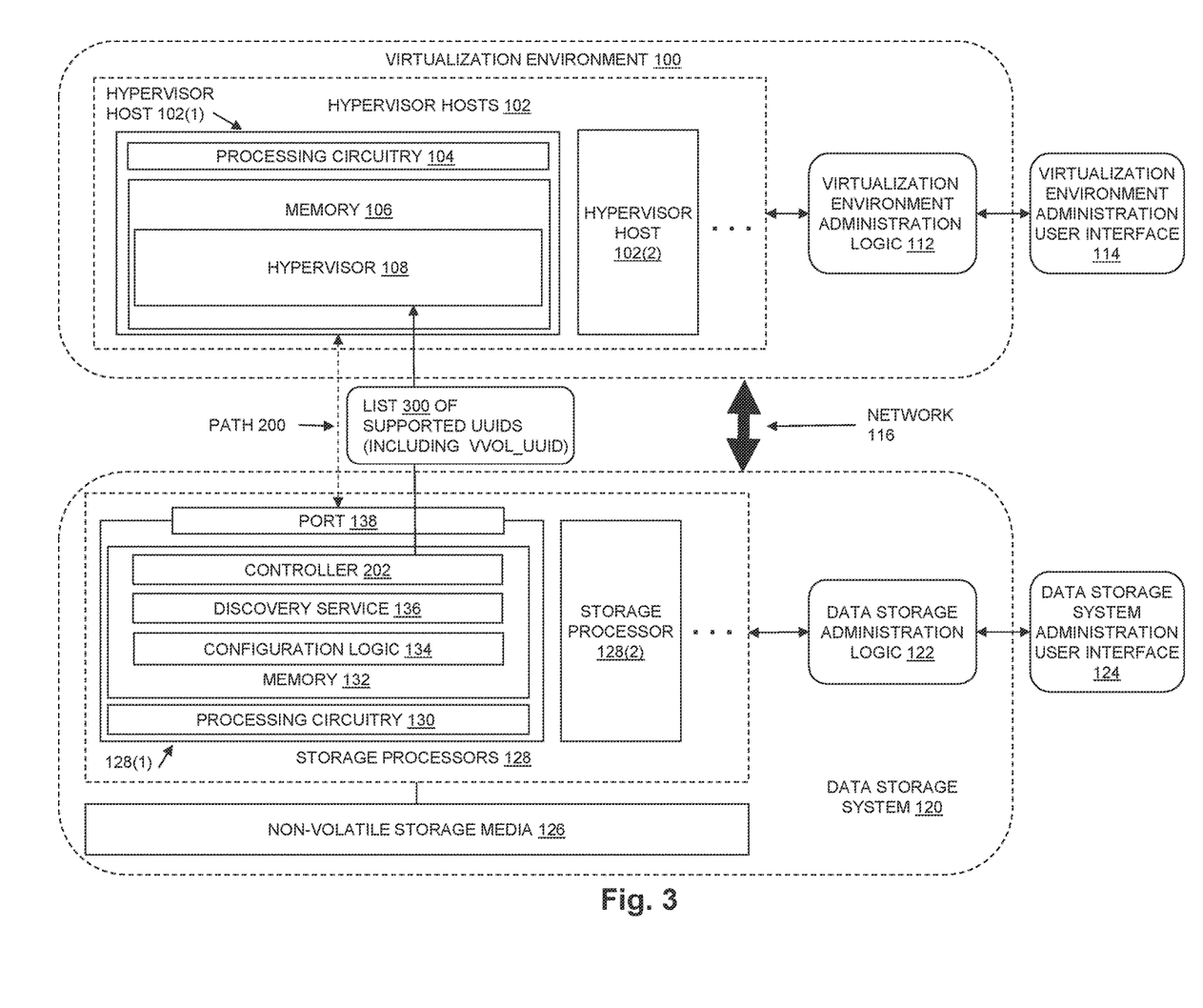
FIG. 3 is a block diagram showing the virtualization environment and data storage system of FIG. 2, with the hypervisor determining whether virtual volumes are supported by the data storage system.

As shown in FIG. 3, after creating the Path 200 and enabling the Controller 202, the Hypervisor Host 102(1) may determine over Path 200 whether virtual volumes are supported by Data Storage System 120. For example, the Hypervisor 108 executing in Hypervisor Host 102(1) may retrieve information from the Data Storage System 120 indicating whether Data Storage System 120 supports virtual volumes. The Hypervisor 108 may then determine, from the information retrieved from Data Storage System 120, that the Data Storage System 120 supports virtual volumes.

In some embodiments, Hypervisor 108 may retrieve information from Data Storage System 120 indicating whether Data Storage System 120 supports virtual volumes at least in part by retrieving a List 300 of supported UUIDs (Universally Unique Identifiers) from the data storage system. For example, Hypervisor 108 may issue an NVMe Identify command (an NVMe Admin command) to Controller 202 with a CNS (Controller or Namespace Structure) parameter having a predetermined value, e.g. 17h. Configuration Logic 134 responds to the NVMe Identify command by transmitting List 300 of supported UUIDs to Hypervisor 108. In the case where Data Storage System 120 supports virtual volumes, Configuration Logic 134 includes a predetermined value, e.g. a special UUID that is defined to indicate support for virtual volumes and referred to herein for purposes of explanation as "VVOL_UUID". When Hypervisor Host 102(1) receives List 300, Hypervisor 108 searches the List 300 for VVOL_UUID. If Hypervisor 108 does not find VVOL_UUID within List 300, then Hypervisor 108 determines that Data Storage System 120 does not support virtual volumes, and host access configuration is completed such that virtual volumes are not created by Hypervisor 108. Otherwise, if Hypervisor 108 does find VVOL_UUID in the List 300, then Hypervisor 108 determines that Data Storage System 120 does support virtual volumes.

Figure 4:
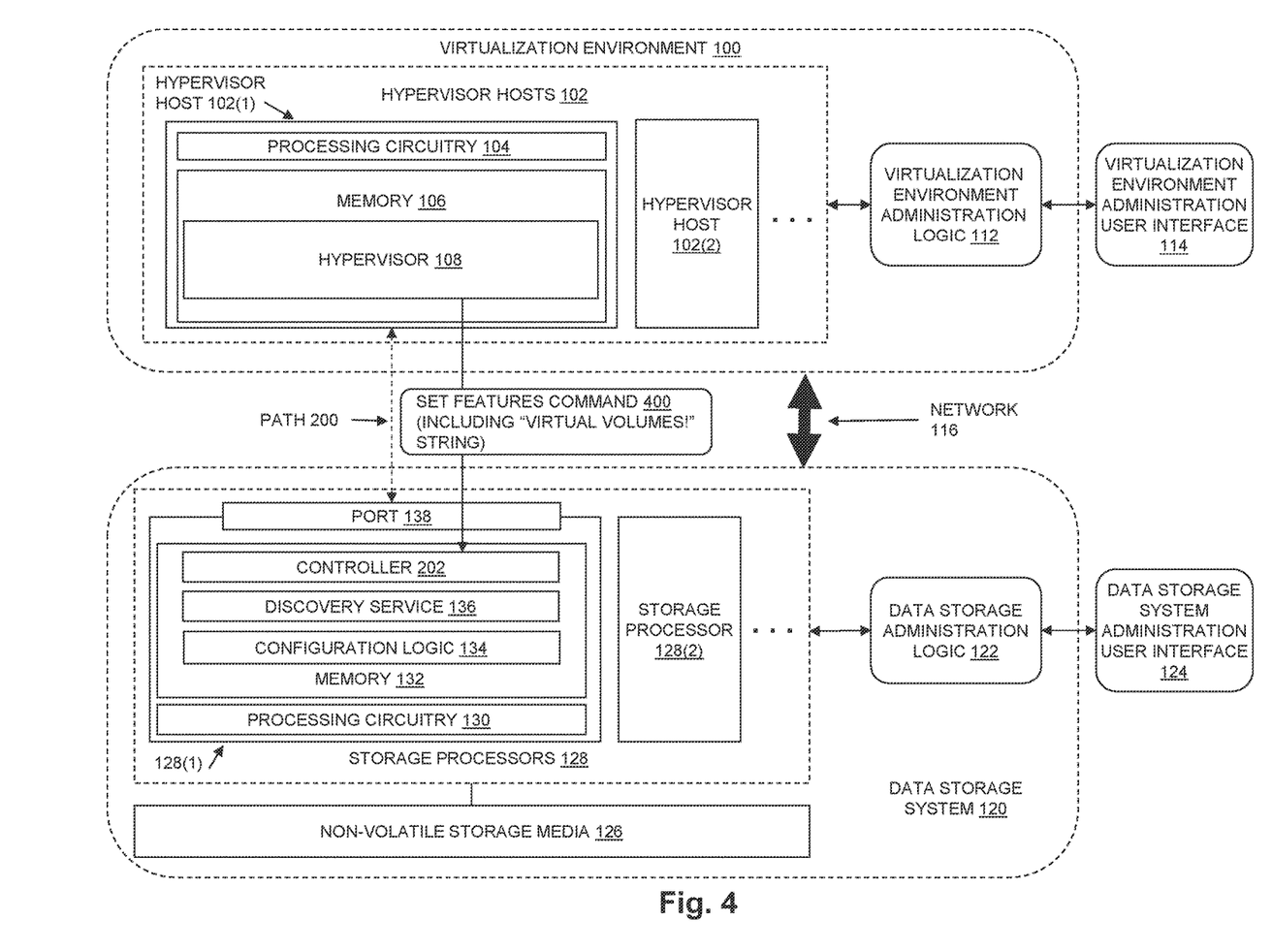
FIG. 4 is a block diagram showing the virtualization environment and data storage system of FIG. 3, with the hypervisor indicating to the data storage system that the hypervisor is capable of using virtual volumes.

FIG. 4 is a block diagram showing the Virtualization Environment 100 and Data Storage System 120 of FIG. 3, with the Hypervisor Host 102(1) indicating to Data Storage System 120 over Path 200 that the Hypervisor 108 executing in Hypervisor Host 102(1) is capable of using virtual volumes, in response to Hypervisor 108 determining that Data Storage System 120 supports virtual volumes. In embodiments in which Hypervisor 108 includes both a vVol personality and a non-vVol personality, it is the vVol personality of Hypervisor Host 102(1) that indicates to Data Storage System 120 over Path 200 that the vVol personality of Hypervisor 108 executing in Hypervisor Host 102(1) is capable of using virtual volumes, using the <Host NQN, Host ID> pair corresponding to the vVol personality of Hypervisor 108.

In some embodiments, in response to the Hypervisor 108 determining that Data Storage System 120 supports virtual volumes, Hypervisor 108 issues a command to Data Storage System 120 indicating that Hypervisor 108 is capable of using virtual volumes. For example, Hypervisor 108 may issue an NVMe Admin Set Features command, as shown by the Set Features Command 400 in FIG. 4. The Set Features Command 400 received from Data Storage System 120 sets a predetermined feature, e.g. within the C0h-FFh range of vendor-specific Feature Identifiers, and referred to herein as the VVOL_FEATURE, to a value that indicates that the Hypervisor 108 is capable of using virtual volumes, and will therefore be consuming virtual volumes exposed by the Data Storage System 120. The command issued to Data Storage System 108 indicating that Hypervisor 108 is capable of using virtual volumes must be issued prior to any I/O command being issued to Controller 202. The value indicating that the Hypervisor 108 is capable of using virtual volumes should be selected to make issuance of the command indicating that a hypervisor is capable of using virtual volumes unlikely to be unintentional. For example, the first 16 bytes of VVOL_FEATURE may be defined as an ASCII string, and value indicating that the hypervisor is capable of using virtual volumes may be "Virtual Volumes!" (a 16-byte ASCII string). Setting VVOL_FEATURE to any other string has no effect. In response to the Set Features Command 400, Data Storage System 120 stores an indication that Hypervisor 108 is capable of using virtual volumes, e.g. an attribute of a host object representing the Hypervisor Host 102(1) indicating that Hypervisor 108 (or the vVol personality of Hypervisor 108) is capable of using virtual volumes.

Figure 5:
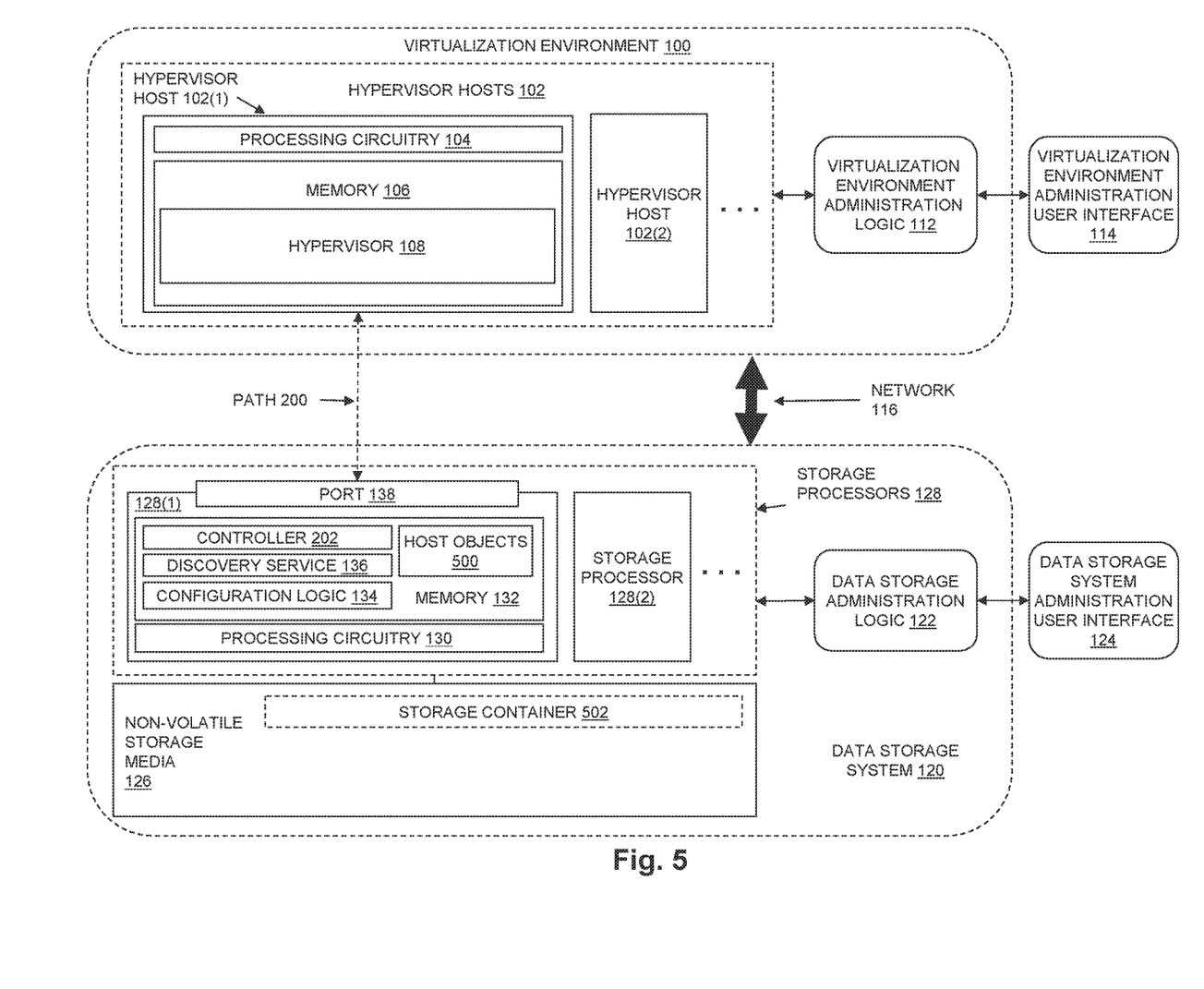
FIG. 5 is a block diagram showing the virtualization environment and data storage system of FIG. 4, after the hypervisor has indicated to the data storage system that it is capable of using virtual volumes, and with a host object for the hypervisor created by the data storage system and indicating that the hypervisor is capable of using virtual volumes, and with a storage container created within which virtual volumes may be created by the hypervisor.

FIG. 5 is a block diagram showing the Virtualization Environment 100 and Data Storage System 120, after the Hypervisor 108 has indicated to Data Storage System 120 that it is capable of using virtual volumes. Configuration Logic 134 has created an NVMe host object for the Hypervisor Host 102(1) with an attribute indicating that Hypervisor 108 (or the vVol personality of Hypervisor 108 is capable of using virtual volumes. Host Objects 500 is made up of NVMe host objects for multiple hypervisor hosts, including one for Hypervisor Host 102(1) indicating that Hypervisor 108 is vVol consuming. In the case where Hypervisor 108 has vVol and non-vVol personalities, the host object for Hypervisor Host 102(1) indicating that Hypervisor 108 is capable of using virtual volumes is associated with the vVol personality of Hypervisor 108 and accordingly with the <Host NQN, Host ID> pair corresponding to the vVol personality of Hypervisor 108.

In some embodiments, a system administrator user may create Host Objects 500 using Data Storage System Administration User Interface 124, for connected and identified NVMe host initiators in Hypervisor Hosts 102. Host objects in Host Objects 500 indicating virtual volume capable hypervisors allow binding of virtual volumes for use by the corresponding hypervisors. In some embodiments, only hosts authorized by the system administrator user are permitted by Data Storage System 120 to perform I/O operations on Data Storage System 120. Accordingly, hypervisor hosts may be authorized by the creation of corresponding host objects by the system administrator user through Data Storage System Administration User Interface 124 that represent authorized hypervisor hosts.

As further shown in FIG. 5, a Storage Container 502 (e.g. an NVMe vVol Storage Container) may be created by Configuration Logic 134 in response to a system administrator user performing operations through Data Storage System Administration User Interface 124. One or more virtual volumes are created in Storage Container 502 by hypervisors running in the Hypervisor Hosts 102 that are capable of using virtual volumes, including the Hypervisor 108. In some embodiments, Storage Container 502 may be contained within Non-Volatile Storage Media 126, and some portion of Non-Volatile Storage Media 126 may be pre-allocated when Storage Container 502 is created. Alternatively, Storage Container 502 may be a logical construct specifying how much non-volatile storage media can potentially be allocated in association with Storage Container 502, without any of Non-Volatile Data Storage Media 126 being allocated at the time Storage Container 502 is allocated.

After creation of Storage Container 502, a system administrator user discovers that Storage Container 502 is exposed by Data Storage System 120 through Virtualization Environment Administrator User Interface 114, and mounts a corresponding vVol Datastore in Virtualization Environment Administration Logic 112 through Virtualization Environment Administration User Interface 114. Next, Hypervisor 108 creates a VASA communication session with the VASA provider in Data Storage Administration Logic 122 by issuing a setContext( ) command using its <Host NQN, Host ID> pair, e.g. the <Host NQN, Host ID> pair for its vVol personality. Data Storage Administration Logic 122 associates the established VASA session with the <Host NQN, Host ID> pair supplied by the Hypervisor 108. If the supplied <Host NQN, Host ID> pair is associated with a host object having an attribute indicating the hypervisor executing on the corresponding hypervisor host is capable of using virtual volumes, Data Storage System 120 will allow virtual volumes in Storage Container 502 to be bound by commands that originate from that <Host NQN, Host ID> pair, e.g. commands issued by Hypervisor 108 (e.g. commands issued by the vVol personality of Hypervisor 108). In this way, Data Storage System 120 allows one or more virtual volumes created in Storage Container 502 to be used by the Hypervisor 108 (e.g. by the vVol personality of Hypervisor 108), in response to an indication that Hypervisor 108 is capable of using virtual volumes, such as the attribute in the host object corresponding to Hypervisor Host 102(1) (e.g. a host object corresponding to the <Host NQN, Host ID> of the vVol personality of Hypervisor Host 108) that indicates that Hypervisor 108 can use virtual volumes (e.g. indicating that the vVol personality of Hypervisor 108 can use virtual volumes).

Figure 6:
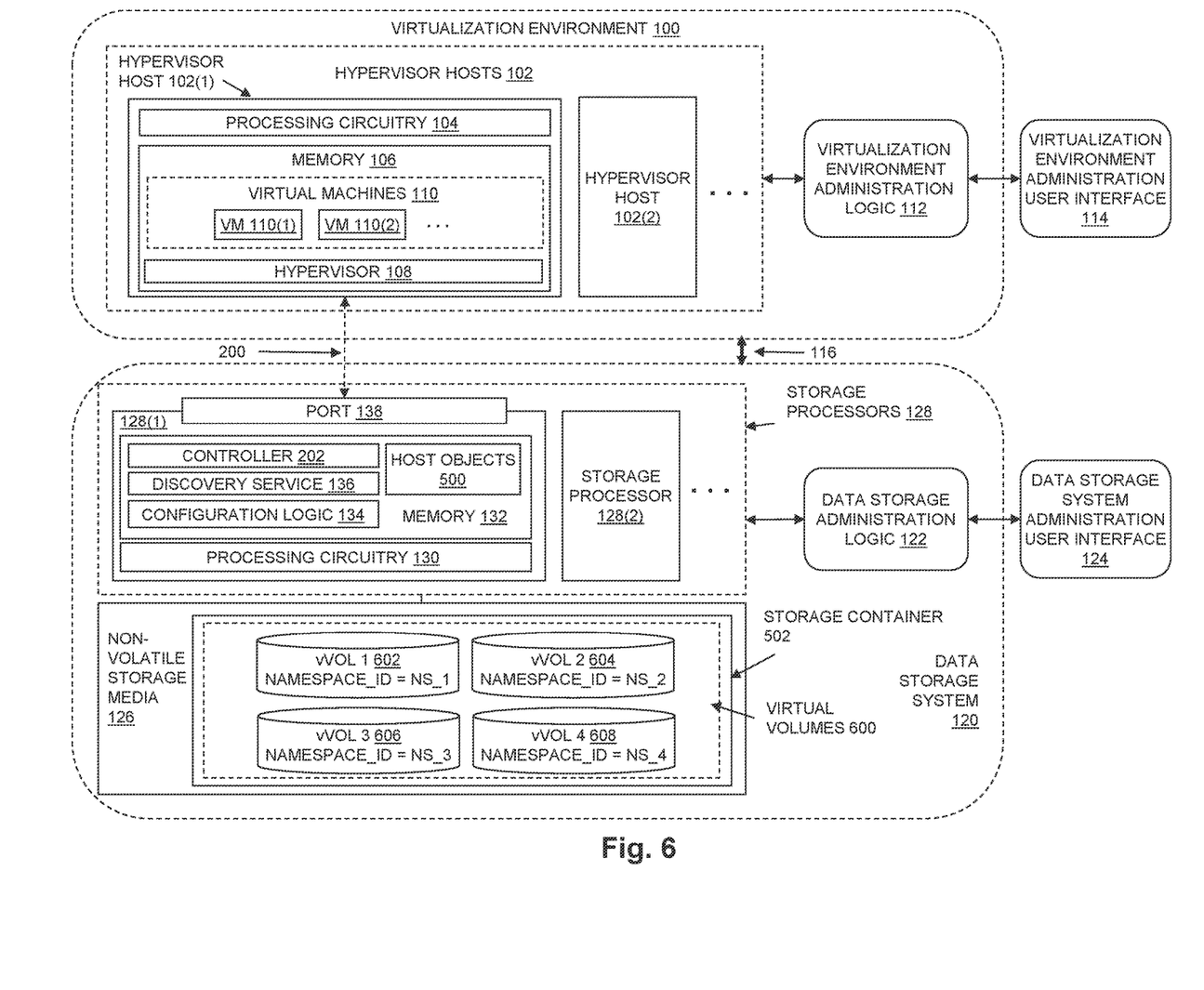
FIG. 6 is a block diagram showing the virtualization environment and data storage system of FIG. 5, with virtual volumes created by the hypervisor and bound to active namespaces for use by the hypervisor to provide non-volatile data storage for corresponding logical disks that are used by virtual machines run by the hypervisor.

FIG. 6 is a block diagram showing the Virtualization Environment 100 and Data Storage System 120, with Virtual Volumes 600 created and bound to active namespaces for use by Hypervisor 108 to provide non-volatile data storage for corresponding logical disks that are used by the Virtual Machines 110 run by the Hypervisor 108, e.g. Virtual Machine 110(1), Virtual Machine 110(2), and so on. In the example of FIG. 6, Virtual Volumes 600 includes at least vVol 1 602 bound to namespace NS_1, vVol 2 604 bound to namespace NS_2, vVol 3 bound to namespace NS_3, and vVol 4 bound to namespace NS_4.

In some embodiments, a system administrator user accesses Virtualization Environment Administration Logic 112 using Virtualization Environment Administration User Interface 114 to create or clone some number of virtual machines (e.g. Virtual Machines 110) and/or virtual disks, e.g., for a vSphere first class disk, or using the Kubernetes container-orchestration system. The following steps may then be performed:

a. Hypervisor 108 invokes one or more createVirtualVolume( ) commands to create Virtual Volumes 600. At this point, the namespaces for Virtual Volumes 600 are not yet active namespaces.

b. Hypervisor 108 invokes one or more bind Virtual Volume( ) command within the VASA session context for Hypervisor Host 102 (e.g. the VASA session context for the <Host NQN, Host ID> pair of the vVol personality of Hypervisor Host 108).

c. Data Storage System 120 (e.g. Configuration Logic 134 and/or Data Storage Administration Logic 122) retrieves the <Host NQN, Host ID> pair from the VASA session, and checks whether that they correspond to a host object with an attribute indicating the capability to use virtual volumes. If the host object for the <Host NQN, Host ID> pair indicates the capability to use virtual volumes, Data Storage System 122 makes the namespaces for Virtual Volumes 600 active on the NVMe controller created for Hypervisor Host 102(1), e.g. Controller 202. In this way, Virtual Volumes 600 may be made available to Hypervisor 108 to store data written to corresponding virtual disks used by the Virtual Machines 110. In other cases where a bind Virtual Volume( ) command is received by Data Storage System 120 within a VASA session context for a hypervisor host corresponding to a host object with no attribute indicating the capability to use virtual volumes, the command is failed.

Figure 7:
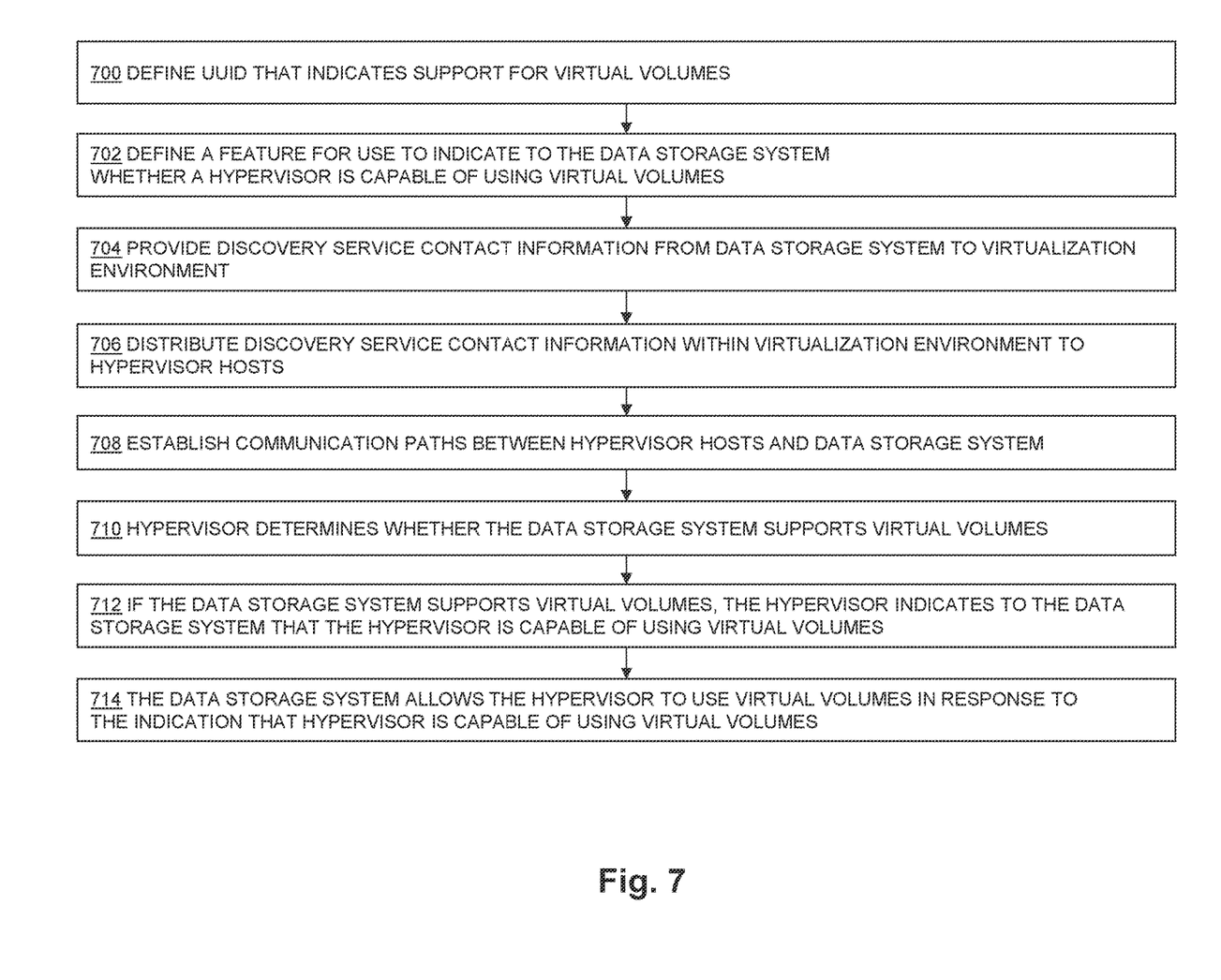
FIG. 7 is a first flow chart showing steps performed by some embodiments.

FIG. 7 is a first flow chart showing steps performed by some embodiments. At step 700, a universally unique identifier (UUID) is defined that indicates support by a data storage system for virtual volumes (e.g. VVOL_UUID). The definition of VVOL_UUID may be performed prior to the start of the disclosed host access configuration process, e.g. at design time, such that VVOL_UUID is a predetermined value.

At step 702, a feature is defined to indicate the support of virtual volumes by a hypervisor to a data storage system (e.g. VVOL_FEATURE). VVOL_FEATURE may be a vendor-specific NVMe Feature selected from within the C0h-FFh range of vendor-specific Feature Identifiers. The definition of VVOL_FEATURE may also be performed prior to the start of the disclosed host access configuration process, e.g. at design time, such that VVOL_FEATURE is a predetermined feature.

At step 704, the data storage system provides discovery service contact information to the virtualization environment. For example, after the VASA provider in the data storage system is registered in the virtualization environment administration logic, the virtualization environment administration logic establishes a VASA session with the data storage system and uses that session to retrieve discovery service contact information from the data storage system.

At step 706, the virtualization environment administration logic distributes the retrieved discovery service contact information within the virtualization environment to the hypervisor hosts in the virtualization environment, enabling the hypervisor hosts to contact an NVMe Discovery Service within the data storage system.

At step 708, the hypervisor hosts in the virtualization environment establish logical communication paths with the data storage system using information provided by the NVMe Discovery Service within the data storage system.

At step 710, a hypervisor within one of the hypervisor hosts determines whether the data storage system supports virtual volumes. For example, after the establishment of a communication path between the hypervisor and the data storage system and creation of a logical controller in the data storage system representing at least a portion of a communication end point in the data storage system for communications over the path between the hypervisor and the data storage system (e.g. an NVMe controller), the hypervisor retrieves a list of supported UUIDs from the data storage system by issuing an Identify command (an NVMe Admin command) with the CNS (Controller or Namespace Structure) parameter set to 17h. The hypervisor then inspects the list of supported UUIDs returned by the data storage system and performs one of the following steps based on the contents of the list:

A. If VVOL_UUID is not contained in the list, then the data storage system does not support virtual volumes, and the hypervisor proceeds without consuming any virtual volumes from the data storage system.

B. If VVOL_UUID is contained in the list, the hypervisor proceeds with the process of host access configuration at step 712.

At step 712, the hypervisor indicates to the data storage system that it is capable of using virtual volumes. For example, in the case where the hypervisor has both a vVol personality and a non-vVol personality, the hypervisor may indicate to the data storage system that its vVol personality is capable of using virtual volumes by issuing a Set Features command that uses VVOL_UUID (via its index in the UUID list retrieved in step 710) to set at least a portion of the VVOL_FEATURE to a value that enables the data storage system to provide virtual volumes to the hypervisor, e.g. a predetermined string such as "Virtual Volumes!" or the like.

At step 714, the data storage system, in response to the indication provided by the hypervisor at step 712 that the hypervisor is capable of using virtual volumes, allows the hypervisor to use one or more virtual volumes within the data storage system.

Figure 8:
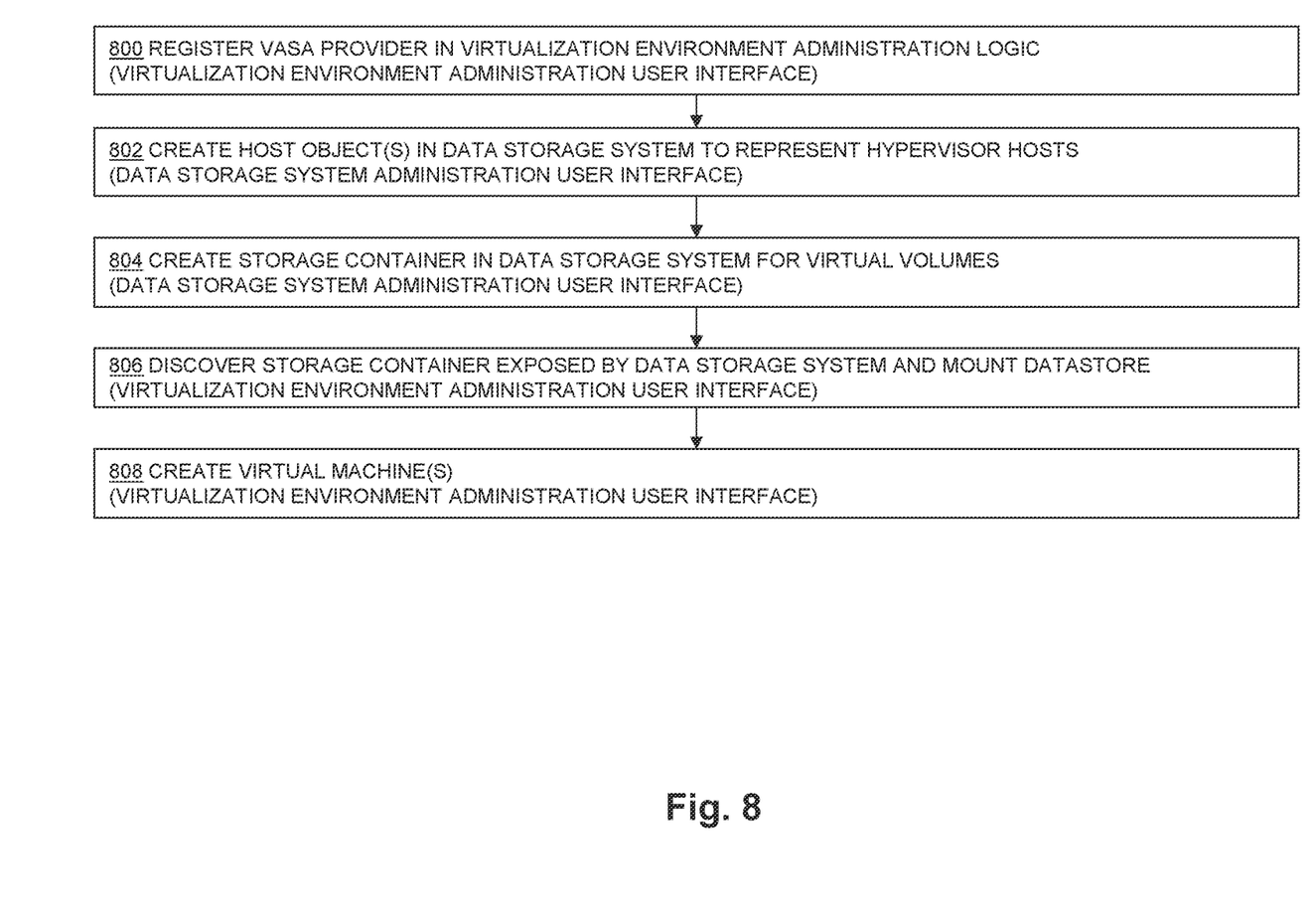
FIG. 8 is a second flow chart showing steps performed by some embodiments.

FIG. 8 is a second flow chart showing steps performed by some embodiments, and illustrates how some embodiments of the disclosed technology only require one switch between the virtualization environment administration user interface and the data storage system administration user interface.

At step 800, a system administrator user uses the virtualization environment administration user interface to register a VASA provider located in the data storage system with the virtualization environment administration logic. The following action are then performed:
 a. The virtualization environment administration logic establishes a communication session with the VASA provider in the data storage system by invoking the setContext( ) command.
 b. The virtualization environment administration logic issues a queryArrays( ) command to obtain from the VASA provider a list of data storage systems and corresponding vVol NVMe Discovery Service contact information for each data storage system.
 c. The virtualization environment administration logic pushes each the NVMe Discovery Service contact information to each hypervisor host in the virtualization environment.
 d. At least one hypervisor host receives and persists in the host's configuration information the NVMe Discovery Service contact information, e.g. as a vVol-specific NVMe Discovery Service. The hypervisor executing within the hypervisor host then performs the following actions:
  i. Virtual volume-specific program code is executed to process the configuration information and have an NVMe driver connect to at least one NVMe Subsystem identified via the NVMe Discovery Service, e.g. to an NVMe Subsystem within the data storage system. In the case where the hypervisor host includes a vVol personality and a non-vVol personality, the <Host NQN, Host ID> pair corresponding to the vVol personality are used.
  ii. The hypervisor finds VVOL_UUID within the list of supported UUIDs returned in response to an NVMe Identify command that was issued with a CNS value of 17h, causing the hypervisor to understand that the NVMe subsystem supports virtual volumes (e.g. that the data storage system supports virtual volumes).
  iii. If the previous step is successful, then the hypervisor issues an NVMe command to the data storage system that informs the data storage system that the hypervisor is capable of using virtual volumes. For example, the command may be an NVMe Admin Set Features command that sets a VVOL_FEATURE to a predetermined value indicating to the data storage system that the hypervisor is capable of using virtual volumes.

At step 802, a system administrator user uses the data storage system administration user interface to create host objects representing corresponding hypervisor hosts that have connected to the data storage system (e.g. host objects representing connected and identified NVMe host initiators). This allows the binding of virtual volumes by hypervisor hosts that have indicated they are capable of using virtual volumes, based on attributes of the host objects indicating whether the hypervisors executing in the corresponding hypervisor hosts are capable of using virtual volumes.

At step 804, a system administrator user uses the data storage system administration user interface to create at least one storage container (e.g. an NVMe Storage Container) in the data storage system that may be used to create virtual volumes.

At step 806, a system administrator user uses the virtualization environment system administration user interface to discover the storage container created at step 804, and mount a corresponding vVol datastore. The following actions are then performed:
 a. A hypervisor creates a VASA session with the VASA provider in the data storage system, e.g. including issuing a setContext( ) command, passing the <Host NQN, Host ID> pair corresponding to its vVol personality to the data storage system.
 b. The data storage system associates the established VASA session with the <Host NQN, Host ID> pair received from the hypervisor. In response to finding a host object for the <Host NQN, Host ID> pair indicating that the hypervisor is capable of using virtual volumes, the data storage system will subsequently allow the binding of virtual volumes to be performed by the hypervisor using the <Host NQN, Host ID> pair.

At step 808, a system administrator user uses the virtualization environment administration user interface to create one or more virtual machines and/or virtual disks. The following actions are then performed:
 a. The hypervisor invokes one or more create Virtual Volume( ) commands to create virtual volumes. The vVol namespaces for the virtual volumes are not active initially.
 b. The hypervisor invokes a bindVirtualVolume( ) command within the VASA session context created in step 806.
 c. The data storage system retrieves <Host NQN, Host ID> pair from the VASA session, determines whether the <Host NQN, Host ID> pair correspond to a host object having an attribute indicating support for virtual volumes, and if so, makes the vVol namespaces for the virtual volumes active on NVMe controller created for the hypervisor host that executes the hypervisor, thus allowing the virtual volumes to be accessed by the hypervisor to support corresponding virtual disks.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer PO attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
providing discovery service contact information from a data storage system to administration logic of a virtualization environment, wherein the discovery service contact information describes how to contact a discovery service within the data storage system;
distributing the discovery service contact information within the virtualization environment from the administration logic of the virtualization environment to at least one hypervisor host within the virtualization environment;
discovering, by the hypervisor host from the discovery service within the data storage system, at least one port located within the data storage system;
establishing, by the hypervisor host, a logical communication path between the hypervisor host and the port located within the data storage system;
retrieving, by the hypervisor host, information from the data storage system indicating whether the data storage system supports virtual volumes;
determining, by the hypervisor host from the information retrieved from the data storage system indicating whether the data storage system supports virtual volumes, that the data storage system supports virtual volumes;
issuing, by the hypervisor host to the data storage system in response to the hypervisor host determining that the data storage system supports virtual volumes, a command indicating that a hypervisor executing within the hypervisor host is capable of using virtual volumes; and
storing, within the data storage system, an indication that the hypervisor executing within the hypervisor host is capable of using virtual volumes.

2. The method of claim 1, wherein retrieving information from the data storage system indicating whether the data storage system supports virtual volumes comprises retrieving a list of supported universally unique identifiers from the data storage system; and
wherein determining that the data storage system supports virtual volumes comprises finding a predetermined value indicating that the storage system supports virtual volumes within the list of supported universally unique identifiers retrieved from the data storage system.

3. The method of 1, wherein the command indicating that the hypervisor executing the hypervisor host is capable of using virtual volumes comprises an NVMe (Non-Volatile Memory Express) admin set features command.

4. The method of claim 3, further comprising:
creating a storage container within the data storage system;
creating at least one virtual volume within the storage container; and
allowing the virtual volume to be used by the hypervisor executing within the hypervisor host in response to the indication that the hypervisor executing within the hypervisor host is capable of using virtual volumes.

5. The method of claim 4, wherein the hypervisor executing within the hypervisor host includes a first set of logic and a second set of logic, wherein the first set of logic is capable of using virtual volumes and the second set of logic is not capable of using virtual volumes; and
wherein allowing the virtual volume to be used by the hypervisor executing within the hypervisor host comprises allowing the first set of logic within the hypervisor to use the virtual volume.

6. A system comprising:
processing circuitry and memory, wherein the memory has program code stored thereon, wherein the program code, when executed by the processing circuitry, causes the processing circuitry to:
provide discovery service contact information from a data storage system to administration logic of a virtualization environment, wherein the discovery service contact information describes how to contact a discovery service within the data storage system;

distribute the discovery service contact information within the virtualization environment from the administration logic of the virtualization environment to at least one hypervisor host within the virtualization environment;

discover, by the hypervisor host from the discovery service within the data storage system, at least one port located within the data storage system;

establish, by the hypervisor host, a logical communication path between the hypervisor host and the port located within the data storage system;

retrieve, by the hypervisor host, information from the data storage system indicating whether the data storage system supports virtual volumes:

determine, by the hypervisor host from the information retrieved from the data storage system indicating whether the data storage system supports virtual volumes, that the data storage system supports virtual volumes;

issue, by the hypervisor host to the data storage system in response to the hypervisor host determining that the data storage system supports virtual volumes, a command indicating that a hypervisor executing within the hypervisor host is capable of using virtual volumes; and store, within the data storage system, an indication that the hypervisor executing within the hypervisor host is capable of using virtual volumes.

7. The system of claim 6, wherein causing the processing circuitry to retrieve information from the data storage system indicating whether the data storage system supports virtual volumes includes causing the processing circuitry to retrieve a list of supported universally unique identifiers from the data storage system; and wherein causing the processing circuitry to determine that the data storage system supports virtual volumes includes causing the processing circuitry to find a predetermined value indicating that the storage system supports virtual volumes within the list of supported universally unique identifiers retrieved from the data storage system.

8. The system of 6, wherein the command indicating that the hypervisor executing the hypervisor host is capable of using virtual volumes comprises an NVMe (Non-Volatile Memory Express) admin set features command.

9. The system of claim 8, wherein the program code, when executed by the processing circuitry, further causes the processing circuitry to:

create a storage container within the data storage system;

create at least one virtual volume within the storage container; and allow the virtual volume to be used by the hypervisor executing within the hypervisor host in response to the indication that the hypervisor executing within the hypervisor host is capable of using virtual volumes.

10. The system of claim 9, wherein the hypervisor executing within the hypervisor host includes a first set of logic and a second set of logic, wherein the first set of logic is capable of using virtual volumes and the second set of logic is not capable of using virtual volumes; and wherein causing the processing circuitry to allow the virtual volume to be used by the hypervisor executing within the hypervisor host includes causing the processing circuitry to allow the first set of logic within the hypervisor to use the virtual volume.

11. A computer program product including a non-transitory computer readable medium having instructions stored thereon, wherein the instructions, when executed on processing circuitry, cause the processing circuitry to perform steps including:

providing discovery service contact information from a data storage system to administration logic of a virtualization environment, wherein the discovery service contact information describes how to contact a discovery service within the data storage system;

distributing the discovery service contact information within the virtualization environment from the administration logic of the virtualization environment to at least one hypervisor host within the virtualization environment;

discovering, by the hypervisor host from the discovery service within the data storage system, at least one port located within the data storage system;

establishing, by the hypervisor host, a logical communication path between the hypervisor host and the port located within the data storage system;

retrieving, by the hypervisor host, information from the data storage system indicating whether the data storage system supports virtual volumes;

determining, by the hypervisor host from the information retrieved from the data storage system indicating whether the data storage system supports virtual volumes, that the data storage system supports virtual volumes;

issuing, by the hypervisor host to the data storage system in response to the hypervisor host determining that the data storage system supports virtual volumes, a command indicating that a hypervisor executing within the hypervisor host is capable of using virtual volumes; and storing, within the data storage system, an indication that the hypervisor executing within the hypervisor host is capable of using virtual volumes.

12. The computer program product of claim 11, wherein retrieving information from the data storage system indicating whether the data storage system supports virtual volumes comprises retrieving a list of supported universally unique identifiers from the data storage system; and wherein determining that the data storage system supports virtual volumes comprises finding a predetermined value indicating that the storage system supports virtual volumes within the list of supported universally unique identifiers retrieved from the data storage system.

\* \* \* \* \*